J. Ashworth,

Steam Trap.

No. 100,249.  Patented Mar. 1, 1870.

J. Ashworth,
Steam Trap.
No. 100,249. Patented Mar. 1, 1870.

2 Sheets, Sheet 2.

WITNESSES: Dana B. Hanson, G. E. Whitney
John Ashworth, INVENTOR.

United States Patent Office.

JOHN ASHWORTH, OF NORTH ANDOVER, MASSACHUSETTS.

Letters Patent No. 100,249, dated March 1, 1870.

STEAM TRAP.

The Schedule referred to in these Letters Patent and making part of the same.

I, JOHN ASHWORTH, of North Andover, in the county of Essex, and State of Massachusetts, have invented a new and useful Steam Trap for discharging the water from steam-pipes, of which the following, with the accompanying drawings, is a specification.

Nature and Object of the Invention.

My invention relates, in the first place, to an improvement in the construction and arrangement of an apparatus for discharging the water of condensation from a steam-pipe or other steam-space, in which the discharging-valve is opened by the weight of the condensed water accumulated in a rising and falling counterpoised chamber, so that the valve may be worked by a small application of power thereto, and also without producing friction that would interfere with the free working of the apparatus, and consists in the combination of the discharging valve opening inward, and a lever for operating the same, attached to the movable chamber, and applied to that part of the valve which is outside of its ground joint, and a fixed stop or fulcrum for the lever, all so arranged that a small preponderance of the chamber will open the valve, and the friction and corresponding resistance due to the transmission of the power through a stuffing-box is avoided.

My invention relates, in the second place, to the arrangement of the movable chamber and the flexible pipe, by which the chamber communicates with the steam space to be drained, and counterpoise, so that when the apparatus is not in use the outlet-valve of the chamber will stand open to permit the entire escape of the water, and afford free communication with the air, and consists in so combining the flexible pipe, the chamber, and the lever of the counterpoise, that by the expansion and contraction of the pipe by the heat of the steam, the leverage of the counterpoise in its relation to the chamber will be so changed that when the pipe is hot the counterpoise will raise the chamber, if empty, and when the pipe is cold the counterpoise will not raise the chamber, as will be described.

Description.

In the drawings—

Figure 1:
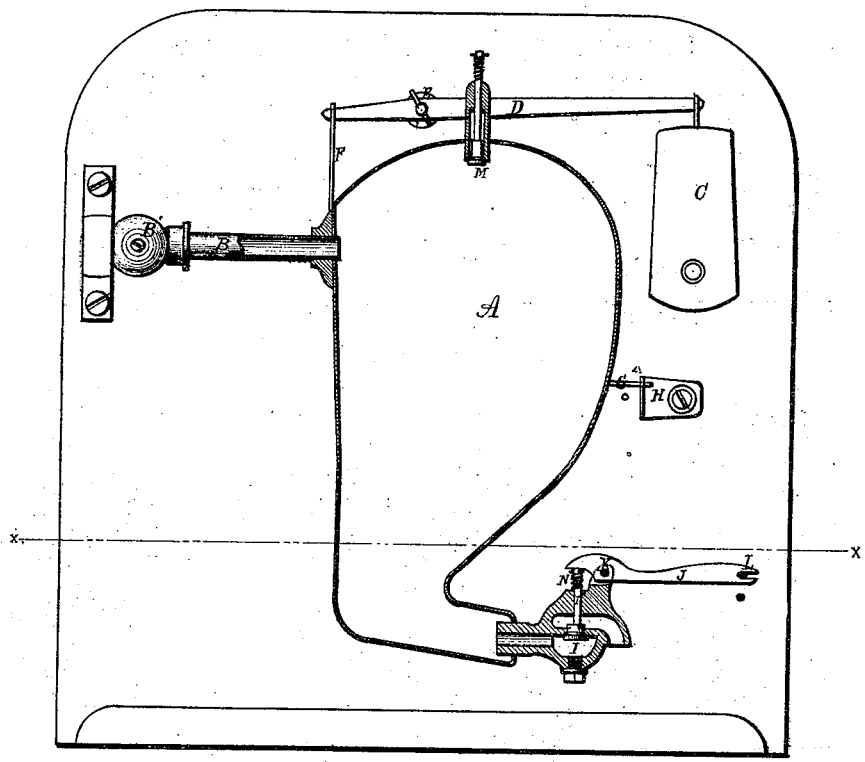
Figure 1 is a vertical section through the middle of the apparatus.
Figure 2:
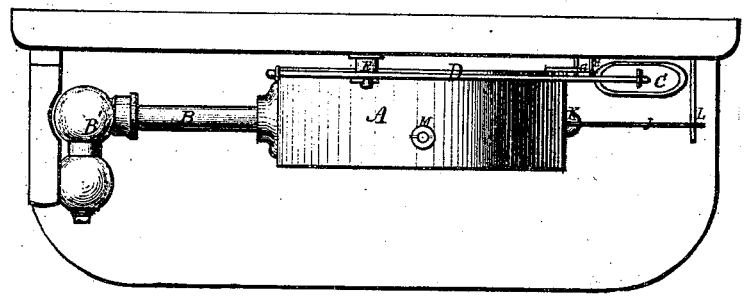
Figure 2 is a plan of the apparatus.

A is a closed chamber of metal to receive the water of condensation, which is attached to the end of the horizontal pipe B, which connects the space to be drained.

The pipe B is made flexible in a vertical direction, which is provided for in the drawing by a swivel-joint, B', but in practice, when it is convenient, it is preferred to use a sufficient length of the pipe B, so that the flexure of the pipe itself will permit the necessary vertical movement of the chamber, and will also act more readily by its expansion and contraction to change the relation of the chamber to the counterpoise C, as will be described.

The counterpoise is suspended to the long arm of the lever D, which has a fixed fulcrum at E, and upon the short arm of the lever the chamber A is supported by the standard F, which is fixed to the chamber.

G is a small arm attached to the chamber A, the outer end of which works freely in a slot in the fixed piece H, and serves to limit the extent of vertical movement of the chamber.

I is the escape-valve, which is attached to the lowest part of the chamber, as shown, and opens inward when the chamber descends, by means of the lever J, which has a movable fulcrum at K on the body of the valve, and a fixed fulcrum at L, working in a slot in the end of the lever J, as shown. The short arm of the lever depresses the stem I' of the valve I when the chamber descends, and the valve is raised again when the chamber is raised by the helical spring N around its spindle, and the pressure of the steam.

Figure 4:
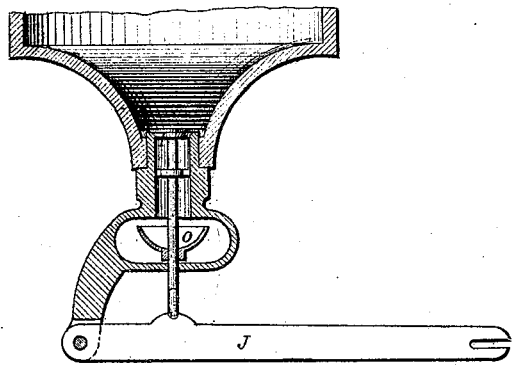
Figure 4 is a vertical section, showing a modification in the form of the chamber of the apparatus, and the arrangement of the outlet-valve and its appurtenances.

M is a vacuum-valve, opening inward to prevent the formation of a vacuum inside the chamber when the steam is shut off. Fig. 4 represents the lower part of a chamber, made of a cylindrical form, with the outlet-valve I arranged to work with a lever, J, placed beneath, as is shown.

Figure 5:
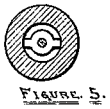
Figures 5 and 6 are details of the same.
Figure 6:
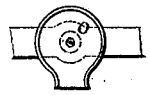
Figure 3:
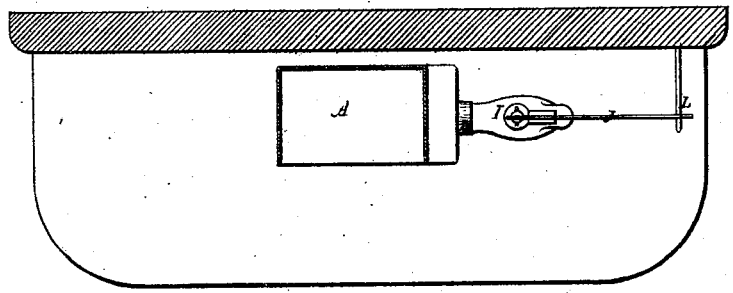
Figure 3 is a horizontal section on the line $xx$ of fig. 1.

O is a cup attached to the valve-spindle, to receive the water discharged from the valve, and conduct it to one side to prevent it from falling upon the lever and its connections. This cup is shown in plan in fig. 6. Fig. 5 shows a horizontal section of the valve-seat. This modification of the apparatus is better adapted to be used where there is danger of freezing, as when it is not in use, and standing with the valve open, there is no part of the same where water could collect, and endanger or obstruct it by freezing.

The operation of the apparatus is this:

When the steam is let on and the pipe B is hot, the weight and leverage of the counterpoise C is so adjusted to the chamber A, that when the chamber is nearly empty it will be raised. When a quantity of water has accumulated by the drainage from the pipe B, its weight with the chamber preponderates over the counterpoise and the chamber falls, and by that operation opens the discharge-valve I, and allows the water to escape until the chamber and contents become so light as to permit the counterpoise, with the pressure of the steam upon the valve, to raise it and close the outlet-valve in an obvious manner. When the steam is shut off the pipe B cools and contracts in length, which draws the chamber with the standard F away from the fulcrum E of the lever D, the standard sliding along on the lever, which makes the short arm of the lever D longer, so that the empty chamber A will then preponderate and keep the outlet-valve I open, affording free communication from the interior to the external air, and escape for any water that may drain into it. When the steam is let on the pipe again becomes hot and expands, and again restores the relation between the counterpoise, lever, and chamber first mentioned. Thus, the weight of the accumulated water is made to operate the apparatus, and all internal mechanism is avoided, and the expansion and contraction of the connecting pipe, by means of the heat of the apparatus, is made to adjust it to the conditions of work or rest without manual intervention.

I am aware that a steam-trap has been heretofore devised in which the discharge-valve was opened and closed by the rising and falling of counterpoised chamber, that received the water of condensation, but in such case the valve was so arranged that the water was discharged from the top of the chamber by the pressure of the steam, and could not empty the chamber by drainage, so that when the pressure of the steam was removed the chamber could not be emptied; and it was also necessary to work the valve-spindle through a stuffing-box. But by my construction both of these difficulties are avoided.

What I claim as my invention is—

1. The combination, with the movable chamber, of the discharge-valve placed at the bottom of the same, the lever for operating the valve, and the fixed stop or fulcrum for the lever, all co-operating substantially as described.

2. The combination of the movable chamber and its accessories for discharging the condensed water, and the counterpoise and its accessories, and the flexible pipe that connects the space to be drained with said chamber in such a manner that by the heating and cooling of the pipe, or some other part of the apparatus that will produce the same result, the expansion and contraction thereby produced will so change the relative preponderance of the counterpoise and chamber as to adapt the apparatus to the conditions of work and rest, substantially as described.

JOHN ASHWORTH.

Witnesses:
 DANA B. HANSON,
 G. E. WHITNEY.